United States Patent

[11] 3,627,602

| [72] | Inventor | Jan C. Van Dijk<br>Delft, Netherlands |
|---|---|---|
| [21] | Appl. No. | 814,051 |
| [22] | Filed | Apr. 7, 1969 |
| [45] | Patented | Dec. 14, 1971 |
| [73] | Assignee | Shell Oil Company<br>New York, N.Y. |
| [32] | Priority | May 6, 1968 |
| [33] | | Great Britain |
| [31] | | 21,342/68 |

[54] METHOD FOR LAMINATING SHEETS
7 Claims, 8 Drawing Figs.

[52] U.S. Cl. ........................................... 156/73,
156/199
[51] Int. Cl. .......................................... B29c 27/08,
B32b 31/20
[50] Field of Search .......................................... 156/73,
580, 197, 199, 380

[56] References Cited
UNITED STATES PATENTS

| 2,633,894 | 4/1953 | Carwile | 156/73 |
| 3,101,404 | 8/1963 | Hill | 156/73 |
| 3,131,104 | 4/1964 | Korn | 156/73 |
| 3,419,447 | 12/1968 | Hewitt | 156/73 |

*Primary Examiner*—Benjamin A. Borchelt
*Assistant Examiner*—James V. Doramus
*Attorneys*—Joseph W. Brown and Martin S. Baer

ABSTRACT: A method and apparatus for laminating sheets in a continuous manner is disclosed. The method comprises locally compressing the sheets in overlapping sections between the loading planes of two loading elements, at least one of which oscillates at a frequency between 0.1 and 1,000 cycles per second. The apparatus comprises loading means comprising two loading elements for compressing the sheets, driving means for transporting the sheets between the loading elements and activating means for oscillating at least one of the two loading elements in the loading direction at a frequency between 0.1 and 1,000 cycles per second (c/s).

PATENTED DEC 14 1971

INVENTOR:
J. VAN DIJK
BY:

*Martin S. Beer*

HIS ATTORNEY

INVENTOR:
J. VAN DIJK
BY: Martin S. Baer
HIS ATTORNEY

3,627,602

METHOD FOR LAMINATING SHEETS

BACKGROUND OF THE INVENTION

The invention relates in particular to a method and apparatus for laminating sheets in a continuous manner. In this type of method the sheets are fed to a passage leading between two loading elements. The sheets are passed between these elements and locally compressed, whereby they adhere to each other during the passage between these elements and leave the loading elements as a laminate.

In the prior art techniques, rollers are applied as loading elements. The rollers are parallelly arranged and have a gap between their outer surfaces, which gap is somewhat smaller in width than the total thickness of the sheets which have to form the laminate.

Although good results are obtained by applying this technique, it is a drawback that the apparatus to be used is rather expensive. The greater part of the cost thereof is required for the rollers, which have to be of large diameter to obtain a desired distribution of the load on the sheets where they are contacted by the rollers. The large weights of the rollers resulting from the large diameters thereof, require costly bearings for the roller shafts. The width of the sheets to be laminated presents another problem. On increasing the length of the rollers in order to treat sheets of larger width, the rollers are liable to sag or bend in the middle, and consequently have to be reinforced, which further increases their weight. A further drawback is the driving up of the adhesive in the wedge-shaped gap between the rollers, which decreases the effective pressures which can be exerted by the rollers in the layer between the sheets, which pressures are decisive for the quality of the adhesion between the sheets in the laminated structure.

The present invention provides a method of pulsating loading or compressing sheets to be laminated in a continuous manner and in which the load required for lamination is distributed over a sufficiently large area of the sheets to prevent squeezing of the adhesive layers between the sheets by too high compression stresses.

SUMMARY OF THE INVENTION

According to the invention, a method of laminating at least two sheets comprises feeding the sheets into a passage leading between substantially parallel parts of the loading planes of two loading elements, at least one of which oscillates at a frequency between 0.1 and 1,000 c./s. in a direction substantially normal to the direction of movement of the sheets between the planes, and locally compressing the sheets in overlapping sections between the loading planes of the loading elements.

The oscillating frequency may be between 10 and 100 c./s. and the degree of overlap may be between 50% and 90%

The laminating apparatus according to the invention is suitable for laminating at least two sheets, and comprises loading means for compressing the sheets to be laminated against each other, said loading means comprising two elements, each having a loading surface, at least part of said loading surfaces being parallel and in a position to cooperate with each other to compress sheets passed therebetween, driving means for transporting the sheets between the loading elements, and actuating means for oscillating at least one of the two loading elements, and actuating means for oscillating at last one of the two loading elements in the loading direction at a frequency between 0.1 and 1,000 c./s., the speed of the transport means and of the actuating means being such that—when the laminating apparatus is operating— the way length covered by the transport means in the period of one single oscillation is less than the width of the active area of the oscillating loading element taken in the direction of movement of the sheets. The laminating apparatus is of relatively lightweight, even when such apparatus is designed for the lamination of sheets of relatively large width.

DESCRIPTION OF THE PREFERRED EMBODIMENT

Any type of sheet may be laminated according to the invention. Thus, sheets of plastic compounds of any composition may be applied, the surface being impermeable, permeable, porous, smooth or rough. Plastic sheets of thermoplastic or thermosetting material may be applied in combination with each other and/or with sheets of a nonplastic nature, such as metal, paper, wood or mineral compositions. The sheets may be in any form, such as film, woven fabric, nonwoven fabric, board, foam, veneer, foil and composites thereof in the form of laminates.

The sheets in the laminate are held together by adhesion. To this end an adhesive may be applied (e.g., coated or sprayed) onto the surfaces of adjoining sheets in the laminate. It will be appreciated that when laminating thermoplastic material, adhesion can be obtained by heating adjoining thermoplastic sheets or thermoplastic layers upon the adjoining sheets. Compression of the heated sheets gives a cheap and quick method for glueing the sheets together.

It will be further appreciated that when combining such a heat-treated plastic sheet with a textile sheet, this textile sheet can be impregnated by the molten layer of the heat-treated sheet, thus forming an integral layer. It is to be understood that this and other types of impregnating techniques in which one of the sheets is embedded in the surface layer of an adjoining sheet is to be considered as a laminating process within the meaning of the present invention.

The laminating apparatus, according to the invention, may be embodied with one of the loading elements being substantially immobile, or supported by elastic means which allow displacement of the element in a direction parallel to the oscillating movement of the other element.

In another embodiment, both loading elements may be supported to allow an oscillatory movement in the loading direction, means being provided to oscillate the elements in counter phase.

The oscillatory loading element, or at least one of the oscillatory elements may be provided with elastic means arranged between the loading surface and the oscillatory means, the elastic means allowing displacement of the loading surface in a direction parallel to the oscillating movement.

In still another embodiment, the elements may be supported to allow an oscillatory movement in the direction of transport of the sheets, means being provided to oscillate the elements in phase.

The invention will now be described with reference to some examples. In the drawing, which schematically shows some examples of laminating apparatuses, FIG. 1 is a perspective view of a preferred laminating apparatus provided with separate loading means and transport means.

Figure 1:
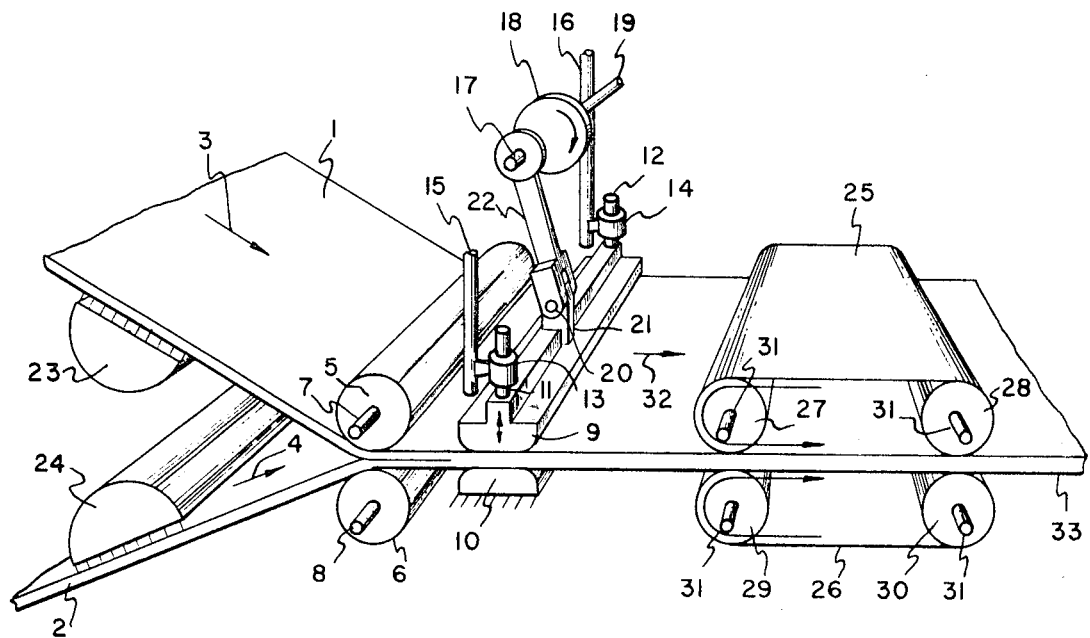

In FIG. 1 of the drawing, a laminating apparatus according to the invention is schematically shown in perspective view. For the sake of simplicity, all details not required for a good understanding of the present apparatus and the operation thereof have been omitted.

The apparatus as shown is suitable for laminating two sheets. These sheets 1 and 2 are supplied from a storage of sheet (not shown) in the direction of the arrows 3 and 4 respectively to a set of guide rollers 5 and 6 respectively (which are rotatably supported around their shafts 7 and 8, which shafts are supported in suitable, not shown, bearings in the frame of the apparatus), and subsequently fed to a passageway between the parallel loading surfaces of a set of loading elements consisting of an oscillating loading element 9 and an immobile loading element 10. As shown in FIG. 1, the length of these elements 9 and 10 is equal to the width of the sheets 1 and 2. The immobile loading element 10 is supported (in a manner not shown) by the frame of the apparatus, whereas the oscillating loading member 9 is provided with guide bars 11 and 12 which may slide in guides 13 and 14 respectively, which guides are attached to members 15 and 16 respectively which form part of the frame of the apparatus.

As shown in FIG. 1, the loading element 9 has a T-shaped cross section which renders this element resistant against bending moments.

The element 9 is actuated at a frequency between 0.1 and 1,000 c./s. by an oscillating installation comprising a pin 17 which is eccentrically mounted on a disc-shaped member 18 mounted on a shaft 19, which is driven by motor means (not shown) via a suitable reduction gearing (not shown). Between the pin 17 and a pin 20 mounted on an extension 21 of the element 9, a connecting rod 22 is arranged, this rod having suitable bores to house the pins 17 and 20.

The laminating apparatus as shown in FIG. 1 further comprises two heating devices 23 and 24 arranged to heat the sheets 1 and 2 respectfully before they are fed to the guide rollers 5 and 6 respectively. The sheets 1 and 2 are heated to a temperature which is sufficiently high to render the sheets adherent.

Transport of the sheets 1 and 2 through the laminating apparatus is obtained by the endless belts 25 and 26, which pass over the roller sets 27, 28 and 29, 30, respectively. These rollers are provided with shafts 31, which are rotatably supported in suitable bearings (not shown) carried by the frame of the apparatus. At least one of the shafts of each set of rollers is actuated by a suitable driving means (not shown), such as an electric motor with reduction gearing.

The method to be carried out by the apparatus as shown in FIG. 1 is the following.

Sheet 1 is supplied from a storage to the guide roller 5 and passed along the heating device 23 and heated to a temperature at which it is adherent. After being passed over the guide roller 5, the sheet 1 is fed between the loading elements 9 and 10 together with the sheet 2 which has previously been heated to the desired temperature by the heating device 24 and guided via the roller 6 to the space between the loading elements 9 and 10.

By the oscillating movement of the loading element 9 those parts of the sheets 1 and 2 which are located between the elements 9 and 10 are subjected to compression in the lower position of the element 9. In the upper position of the element 9 the sheets 1 and 2 are not loaded and the sheets may be advanced between the elements in the direction of the arrow 32 by the action of the transport device comprising the endless belts 25, 26.

During a single cycle of the oscillating movement of the loading element 9, the sheets are advanced over a distance which is less than the width of the active area of the loading element 9. By "active area" is meant that part of the loading element which actually compresses the sheets. As can be seen from FIG. 1, the longitudinal edges of the element 9 have been rounded off, which reduces the active area of this element 9.

Thus by making the way length covered by the endless belts 25, 26 of the transport device over the time period equaling one cycle of the oscillating movement smaller than the width of the active area of the loading element 9, the sheets 1 and 2 will be locally compressed in overlapping sections by the elements 9 and 10 and consequently be laminated over their total width and length as far as they have passed between the loading elements 9 and 10.

It will be appreciated that the movement of the laminated sheet 33 between the endless belts 25 and 26 is substantially continuous. The difference between the speed of the endless belt, and the speed of the sheets 1 and 2 when passing between the loading elements 9 and 10 is due to the periodic halting of the movement of the sheets 1 and 2 by the loading elements 9 and 10, and will be compensated by the rhythmic lengthening and shortening of the laminate 33 over the length thereof extending between the loading elements 9, 10 and the endless belts 25, 26 of the transport device. At the lower frequencies of the above range between 0.1 and 1,000 c./s., it is advisable to create a sufficient distance between the loading elements and the transport device to allow the required stretching of the laminate 33 without increasing the load therein to an undesired extent.

If desired, the laminate 33 may at some place between the loading elements 9 and 10 and the transport belts 25, 26 be looped through a tensioning device (not shown) which is suitable to feed laminate under a substantially constant tension to the endless belts when the loading elements are in the "closed" position, and to store laminate under a substantially constant tension when the loading elements are in the "open" position.

The example which will now be described with reference to FIGS. 2 and 3 of the drawing is in particular designed for the lower frequencies of the range of frequencies as mentioned above.

The elements 40 and 41 as shown in these FIGS. are both activated by oscillating means and are both suitable for compressing the sheets 42, 43 as well as for transporting the sheets 42, 42 and the laminate 44 performed therefrom through the laminating apparatus. The element 40 has a cross section in the shape of a shoe, and is at one end thereof connected to a spring element 45, which at its other end is connected to an oscillating member 46, which oscillates in the direction as indicated by the arrows 47 and is supported against lateral displacement by a guide 40. The loading shoe 40 is supported at one side of its extension 40A by a guide plane 49. As can be seen from FIG. 2, the element 41 and the equipment cooperating therewith is equal but symmetric to the element 40 and the equipment cooperating therewith.

Figures 2, 3:
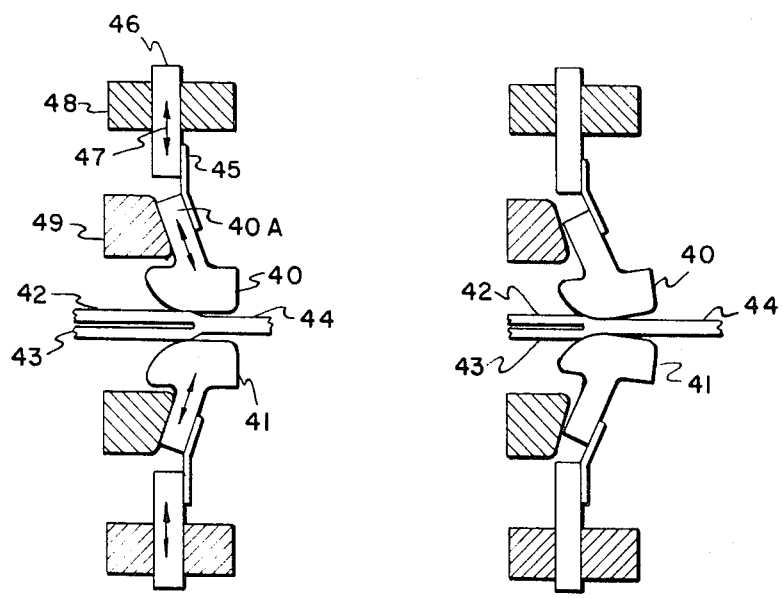
FIG. 2 shows a side view of a set of oscillating elements which load the sheets to be laminated and subsequently transport them.
FIG. 3 shows the elements according to FIG. 2 in another position.

The operation of the laminating apparatus as schematically shown in FIG. 2 will now be described. As the movements of the two loading elements 40 and 41 are symmetric with respect to the plane of symmetry of the side view of the laminating apparatus as shown in FIG. 2, only the cycle of movements of the element 40 will be described hereinafter.

During the first part of the downward movement of the oscillating element 46 (which is operated by a suitable oscillator, not shown) the side of the extension 40A which is in contact with the guide plane 49 is guided along this plane and the loading surface of the element 40 is moved downward parallel to the sheets 42 and 43 (and to the loading surface of the element 41) to compress the sheets 42 and 43 to form the laminate 44. That part of the laminate 44 lying between the loading surfaces of the elements 40 and 41 in the position as shown in FIG. 2 has been formed during compression or loading periods of preceding cycles.

During the second part of the downward movement of the element 40, the contact between the extension 40A of the element 40 and the guide plane 49 is broken, and the element 40 is urged into the position as shown in FIG. 3 of the drawings. By this latter displacement of the element 40 the sheets are precompressed (where in contact with the elements 40 and 41) and the laminate 44 is transported to the storage thereof (not shown). The upward movement of the oscillating element 46 retracts the elements 40 to the initial position as shown in FIG. 2.

It will be appreciated that the laminating apparatus according to FIGS. 2 and 3, of which only the loading elements have been shown, is further provided with suitable storage means for the sheets 42 and 43 and for the laminate 44, and with means for rendering adhesive the desired surfaces of the sheets 42 and 43. Further, there may be arranged guide rollers for guiding the sheets and the laminate along a desired path through the laminating apparatus.

The actuating means for actuating the oscillating members 46 may be formed by an eccentric crank mechanism, an hydraulically or pneumatically actuated piston, an electromagnetic coil or any other means suitable for the purpose.

An alternative for the construction according to FIG. 2 will now be described with reference to FIG. 4, which schematically shows a side view of a set of loading elements and their actuating means which impart two oscillating movements to the loading elements. The stroke periods of the two oscillating movements alternate in such a way that a full cycle from the elements contains the following four steps:

Step A: displacement of the loading elements to compress the sheets;

Step B: displacement of the loading elements to transport the sheets in a compressed condition;

Step C: displacement of the loading elements to unload the sheets; and

Step D: displacement of the loading elements to return the elements to their initial position.

The sheets 50 and 51 are passed through the passage between the loading elements 52 and 53 so as to form a laminate 54 where compressed by these elements 52 and 53. Each loading element is operated by a first oscillator imparting thereto a vertical oscillation (i.e., an oscillation having an oscillating direction which is normal to the sheets 50 and 51) and by a second oscillator imparting thereto a horizontal oscillating (i.e., an oscillation having an oscillating direction which is parallel to the desired direction of movement of the sheets 50 and 51). The first and second oscillator cooperating with the loading element 52 are indicated by the numerals 55 and 56 respectively, whereas these oscillators cooperating with the loading element 53 are indicated by the numerals 57 and 58 respectively. The oscillators 55–58 each consist of a cylinder/piston arrangement. The cylinders of the oscillators 55 and 57 are hingeably connected to the frame of the laminating apparatus by hinges 59, 60 respectively, whereas the piston rods 61 and 62 of these oscillators are coupled to the loading elements 52 and 53 respectively via hingeable couplings 63, 64 respectively. The oscillators 56 and 58 have the cylinders thereof immovably mounted on the frame of the laminating apparatus, whereas the piston rods 65, 66 thereof are provided with pins 67, 68 respectively which are slidably mounted in the slots 69, 70 respectively which are arranged in the loading elements 52, 53 respectively.

The oscillators 55–58 are hydraulically operated, and in such a manner that the oscillators 55 and 57 are operating in counterphase, whereas the oscillators 56 and 58 operate in phase. A full cycle of the oscillator operation contains the following four steps, which are indicated in FIG. 4 by the arrows A–D.

Step A

The pistons of oscillators 55 and 57 are pressurized such that the loading elements 52 and 53 move towards each other, thereby compressing the sheets 50 and 51 to laminate 54. As can be seen in FIG. 4, which shows the loading elements 52 and 53 in the position just before Step A begins, there is an overlap of about 80 percent, which means that 20 percent of the width of the active loading area of the loading elements 52 and 53 is used for the initial compression of the sheets 50, 51, while the remaining 80 percent is used for recompression of the laminate 54.

Step B

In the position of the loading elements 52, 53, wherein the sheets 50, 51 are compressed, the oscillators 56 and 58 are activated by pressurizing the pistons thereof in such a way that the loading elements move to the right, thereby transporting the laminate 54 towards the storage thereof (not shown) and at the same time drawing a fresh supply of the sheets 50 and 51 to a position in which they can subsequently be compressed by the loading elements 52 and 53. The relative positions of the oscillators, loading elements, sheets and the laminate at the end of Step B are shown in FIG. 5. Subsequent to this step, there follows Step C The pistons of the oscillators 55 and 57 are pressurized in this step to move the loading elements 52, 53 to increase the passage between the loading surfaces thereof, thereby freeing the laminate 54. After Step C, the pistons of the oscillators 56, 58 are pressurized in such a way that in Step D The loading elements 52 and 53 are moved to the position thereof as indicated in FIG. 4.

Figures 4, 5:
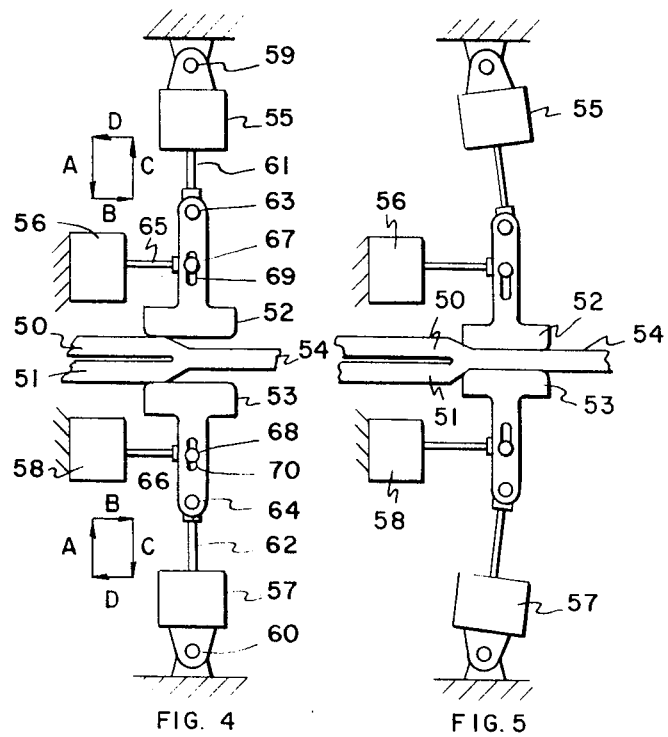
FIG. 4 shows a side view of a set of oscillating elements which can load and transport the sheets to be laminated.
FIG. 5 shows the elements according to FIG. 4 in a different position of the working cycle thereof.

It will be appreciated that the oscillators 55 and 57 in the arrangement as shown in FIGS. 4 and 5 operate in counterphase, whereas the oscillators 56 and 58 operate in phase. The oscillating movements of the oscillators 55 and 57 take place in Steps A and C, and the oscillating movements of the oscillators 56 and 58 take place in Steps B and D. If desired, however, the periods in which consecutive steps take place may partly overlap.

For the sake of simplicity, the equipment required to distribute the hydraulic pressure fluid to the various cylinders of the oscillators and to bring these cylinders into communication with low-pressure regions for venting purposes is not shown in FIGS. 4 and 5 of the drawing.

Although the oscillators as shown in FIGS. 4 and 5 are hydraulically operated, it will be clear that the invention is not limited to this type of oscillator. Any other type of oscillator (e.g., mechanical, pneumatic or electric) may be applied for this purpose.

Figure 6:
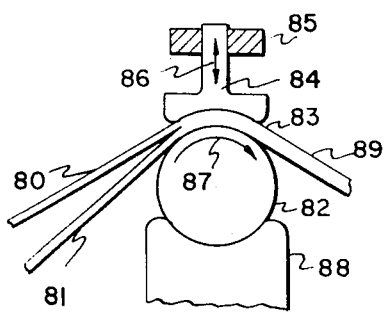
FIG. 6 shows a side view of a set of loading elements having curved loading surfaces.
Figure 7:
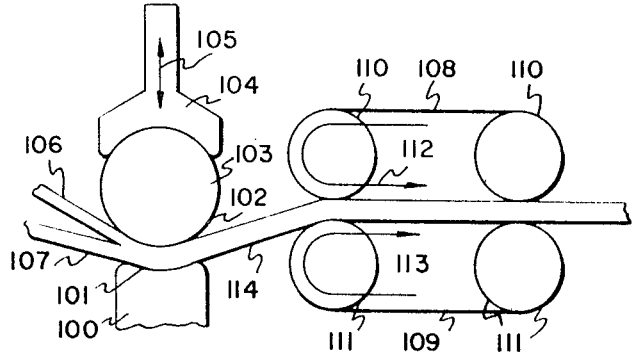
FIG. 7 shows a set of loading elements having curved loading surfaces, which set is combined with a separate transport means for transporting the sheets.

In FIGS. 6 and 7, two alternative constructions of loading surfaces for a laminating apparatus according to the invention are shown, both surfaces being curved. In the schematically indicated apparatus, of which a side view is shown in FIG. 6, the sheets 80 and 81 are passed through the passage formed by part of the cylindrical surface of a roller 82 and by the curved surface 83 of the oscillating loading element 84, which latter surface is concentrically arranged with respect to the cylindrical surface of the roller 82. The loading element 84 is guided by guide 85 and actuated by an oscillating actuator (not shown) at a frequency between 0.1 and 1,000 c./s. The oscillating movement is indicated by the arrows 86 which are directed towards and away from the center of the cylindrical roller 82. This roller is supported by the frame (not shown) of the laminating apparatus and is rotatable around its axis. Means (not shown) are provided to rotate the roller in the direction indicated by the arrow 87. To prevent undesired sagging of the middle zone of the roller 82, a support 88 is arranged therebelow.

In operation, the sheets 80 and 81 are periodically loaded by the loading element 84 at the location where they pass through the passage between the curved surface 83 and the cylindrical surface of the roller 82. The roller 82 is rotated, and will thus transport the sheets 80, 81 and the laminate 89 formed therefrom by compression, over the periods that the sheets 80, 81 are not or are only partially loaded. The way length of this transport during a single period is always smaller than the width of the active area of the loading elements.

It will be appreciated that the equipment required for rendering the sheets 80 and 81 adhesive, the guide rollers and the storage rollers for the sheets and laminate, have not been shown in FIG. 6 for the sake of simplicity.

In the laminating equipment as shown in FIG. 7, the loading and the transporting are performed by separate parts of this equipment. The loading function will be performed by the immobile loading element 100 which has a negatively curved loading surface 101 cooperating with a cylindrical surface 102 arranged parallel thereto. This latter surface is formed by the outer surface of a cylindrical roller 103 which is freely rotatable around the axis thereof and carried by a loading element 104 which is (in a manner known per se) oscillated at a frequency between 0.1 and 1,000 c./s. in the direction as indicated by the arrows 105. Part of the surface of the roller 103 is supported by the element 104 to minimize the deformation of the roller axis during the periods that the roller is pressed on the sheets 106 and 107 which are passed between the curved surfaces 101 and 102.

The transport function in the apparatus as shown in FIG. 7 is performed by the endless belts 108 and 109 running over rollers 110 and 111 respectively, these rollers being actuated in a known manner to drive the belts in the direction of the arrows 112 and 113 respectively.

The laminate 114 which is formed by the compression of the sheets 106 and 107 by the loading elements 100 and 104 is transported by the endless belts 108 and 109 over at least the periods that the sheets 106 and 107 and the laminate 114 are not loaded by the loading members 100 and 104. Over the remaining periods, the laminate 114 is stretched over the distance between the loading elements 100, 104 and the belts 108, 109. The way length over which the laminate is transported during a single period is always less than the width of the active area of the loading elements, e.g., between 50 and 10 percent of this width.

Figure 8:
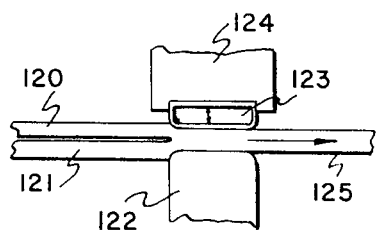
FIG. 8 shows a side view of a set of loading elements, of which one loading element is hydraulically or pneumatically activated.

The equipment such as storage means, guide rollers and activating means for rendering the sheets adhesive, has not been shown in FIG. 7 for the same reason as already stated in connection with FIGS. 2–6. This equipment is also omitted from FIG. 8, which shows a schematic view of an oscillating loading member which can be applied in a laminating apparatus according to the invention.

The sheets 120 and 121 are passed between an immobile loading element 122 and an inflatable member 123 which is suitable to exert load on the sheets when in an inflated position. One side of the member 123 is attached to the frame of the apparatus, of which only part 124 has been shown. The interior of the inflatable member communicates with a pneumatic or hydraulic source with oscillating pressure of a frequency between 0.1 and 1,000 c./s. During the periods of low pressure within the member 123, the laminate 125 is transported by means of suitable transport means (such as endless belts of the type as shown in FIG. 7), whereas during the periods of high pressure, the sheets 120 and 121 are compressed to form the laminate and are immobile or substantially immobile between the loading surfaces. The way length of transport by the transport means is in a single period always less than the width of the active loading surface of the inflatable member 123.

It will be appreciated that the laminating apparatuses as described hereinabove by way of example may all be provided with control means which permit:

a. the control of the frequency of the various oscillating members within the range of 0.1 to 1,000 c./s.;

b. the control of the amplitude of the various oscillating members;

c. the control of the minimum distance between the loading elements; and d. the control of the overlap occurring at consecutive local compressions of the sheets to be laminated.

The application of the invention is further not restricted to a method and apparatus for laminating sheets over the full width thereof, but may be sued with equal results for laminating sheets along parallel tracks or any other desired pattern. This latter may be obtained by subdividing at least one of the loading elements into sections, which may separately be brought into oscillation by a suitable control apparatus when the particular loading element is to be laminated.

The invention may further also be applied to laminating apparatuses in which at least one loading element, whether an oscillating element or an immobile element, is elastically supported in a manner which allows displacement of the loading element in a direction parallel to the loading direction. Sheets laminated by this equipment are subjected to a substantially constant load during the compression thereof by the loading elements.

Means for decreasing the time period required for consolidation of the adhesive forces exerted between the sheets may be arranged between the loading elements and the storage for the laminate. Such means may be formed by cooling means and/or drying means.

The length of the active area of the loading elements (i.e., the dimension of the active area measured in the direction parallel to the width of the sheets passing therealong) need not be equal to the width of these sheets, but may be larger or even smaller than this width. The dimensions of the active loading area of each loading element may—in a direction of movement of the sheet and the direction normal thereto—have a ratio between 1:5 and 1:30.

Although the methods as described with reference to the drawings all refer to the lamination of only two sheets, it will be clear that the invention is not limited to the lamination of this restricted number of sheets, and that the method as well as the apparatus according to the invention can be used for laminating more than two sheets simultaneously.

EXAMPLE

Into an apparatus provided with loading means for compressing sheets to be laminated against each other, said loading means comprising two elements each having a loading surface, at least part of each of said loading surface being parallel and in a position to cooperate with each other to compress sheets passed therebetween, means for transporting the sheets between the loading elements, and actuating means for oscillating at least one of the two loading elements in the loading direction at a frequency between 0.1 and 1,000 c./s. The speeds of the transport means and of the actuating means are such that—when the laminating apparatus is operating—the way length covered by the transport means in the period of one single oscillation is less than the width of the active area of the oscillating loading element taken in the direction of movement of the sheets. According to claim 7 a foamed polystyrene sheet is pressed together with a layer of Kraft paper on each side, the paper being coated on the inside with a polystyrene film. The paper sheets are heated to a temperature sufficient to make the polystyrene film adhesive, i.e., 170° C. The paper sheets together with the sheet of polystyrene foam are passed between the loading surfaces of the apparatus, which are oscillating at 40 c./s. The laminate is transported at a way length of 30 percent of the width of the active area of the loading elements such that the sheets are compressed in sections which overlap to the degree of 70 percent. This treatment gives a firm bond between the sheet of foamed polystyrene and the sheets of Kraft paper.

I claim as my invention:

1. A method of laminating at least two sheets comprising rendering at least one adjoining surface of the sheets adhesive, then feeding the sheets into a passage leading between substantially parallel parts of the loading planes of two loading elements, at least one of which oscillates at a frequency between 0.1 and 1,000 c./s. in a direction substantially normal to the direction of movement of the sheets between the planes, and locally compressing the sheets in overlapping sections between the loading planes of the loading elements, whereby the sheets leave the loading elements as a laminate.

2. A method according to claim 1, wherein at least one loading element oscillates at a frequency between 10 and 100 c./s.

3. A method according to claim 1 wherein the sheets are compressed in sections which overlap between 50 and 90 percent.

4. A method according to claim 1 wherein both elements oscillate in phase in directions parallel to the direction of movement of the sheets between the loading planes of the elements, the periods of displacement of the elements in the direction of movement of the sheets at least partly coinciding with the periods during which the loading elements compress the sheets.

5. A method according to claim 1 wherein both elements oscillate in counterphase in a direction normal to the direction of movement of the sheets between the loading planes.

6. A method as in claim 1 wherein a surface of at least one sheet is rendered adherent by applying an adhesive.

7. A method as in claim 1 wherein the surface of at least one sheet is rendered adherent by heating.

* * * * *